No. 640,816. Patented Jan. 9, 1900.
G. M. ROSS.
ATTACHMENT FOR POTATO HARVESTERS.
(Application filed Aug. 14, 1899.)
(No Model.)
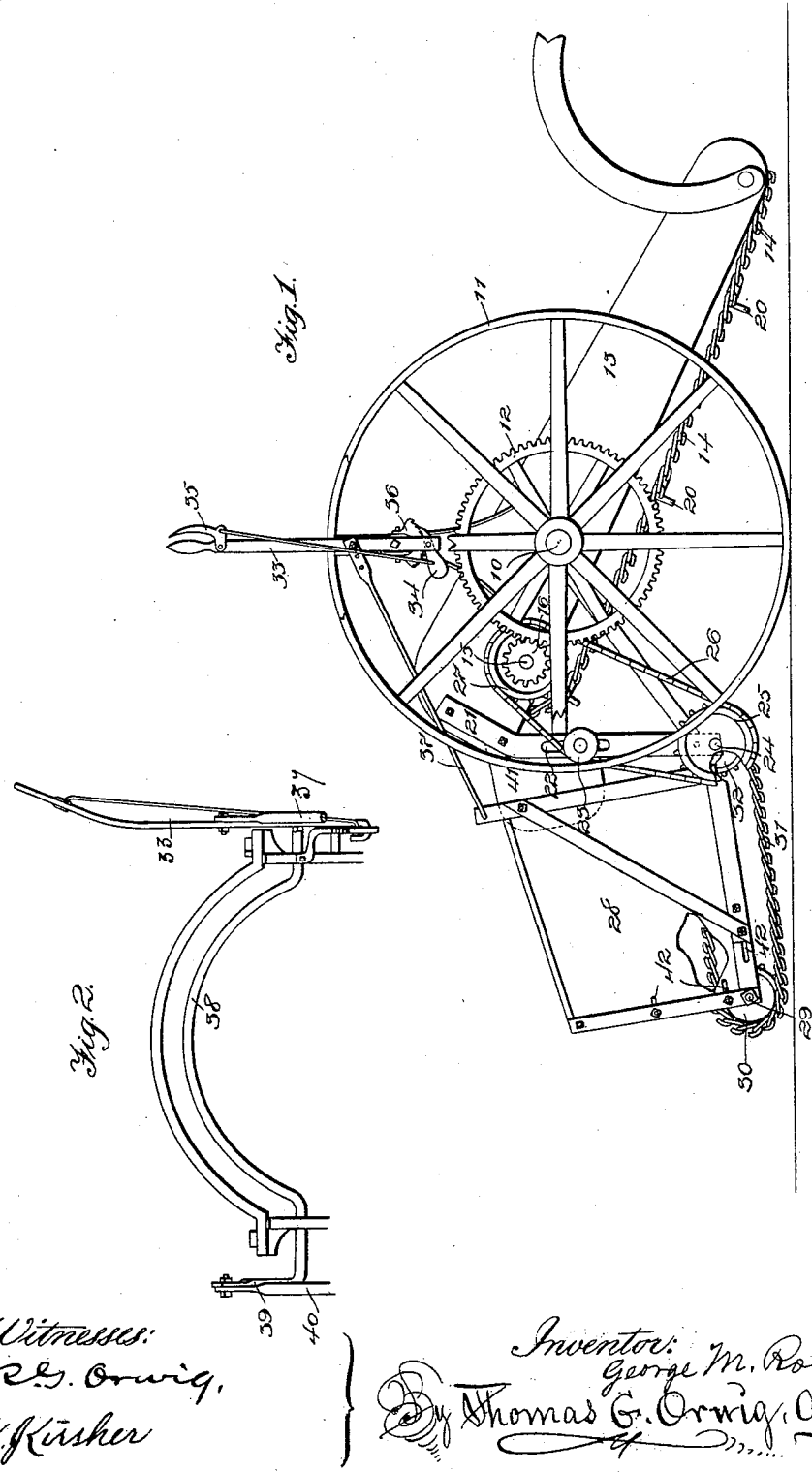
Witnesses:
T. G. Orwig,
W. Kasher
Inventor:
George M. Ross,
By Thomas G. Orwig, Atty
THE NORRIS PETERS CO., PHOTO-LITHO., WASHINGTON, D. C.

UNITED STATES PATENT OFFICE.

GEORGE M. ROSS, OF GRINNELL, IOWA.

ATTACHMENT FOR POTATO-HARVESTERS.

SPECIFICATION forming part of Letters Patent No. 640,816, dated January 9, 1900.

Application filed August 14, 1899. Serial No. 727,116. (No model.)

*To all whom it may concern:*

Be it known that I, GEORGE M. ROSS, a citizen of the United States, residing at Grinnell, in the county of Poweshiek and State of Iowa, have invented a new and useful Attachment for Potato-Harvesters, of which the following is a specification.

This invention relates to that class of potato-harvesters in which the potatoes are conveyed over a sieve-like carrier which separates them from the earth and which are dropped at the rear of the machine; and it consists of an attachment which may be applied to potato-harvesters of this class—such, for example, as the harvester illustrated in the patent issued to Ashford T. Dowden February 1, 1887, and numbered 357,119.

The object of this invention is to provide means for carrying the potatoes to a point some distance in the rear of the endless carrier, so that the broken clods and other matter may first fall to the ground and then the potatoes be dropped on top of the ground, so that they may be readily seen and not be buried by said matter.

My invention consists in certain details in the construction, arrangement, and combination of an auxiliary conveyer at the rear of the machine, as hereinafter more fully set forth, pointed out in my claims, and illustrated in the accompanying drawings, in which—

Figure 1 shows in side elevation the harvester complete, except for the digging apparatus at its front, with my attachment in position thereon and parts broken away to show certain details of construction. Fig. 2 shows a rear elevation of part of the machine-frame and also the arched shaft and accompanying parts for raising and lowering the auxiliary conveyer.

Referring to the accompanying drawings, I have used the reference-numeral 10 to indicate the main axle of the harvesting-machine, upon which the traction-wheels 11 are fixed and to which also the cog-wheel 12 is fixed. The frame of the machine is indicated by the reference-numeral 13, and 14 indicates the conveyer, composed of a series of transverse bars passed over sprocket-wheels at its front and back ends and arranged to receive the earth and potatoes as they are dug from the ground by the shovel at the front of the machine. The shaft 15 carries the sprockets at the rear of the machine over which this conveyer travels, which shaft is driven by means of the pinion 16 fixed thereto and meshed with the cog-wheel 12.

My attachments comprise two flat supporting-arms 21, fixed to the sides of the machine-frame to project downwardly and rearwardly, one of them having near its central portion a slot 22, in which an idler 23 is adjustably clamped. At the lower end of each of these side pieces a shaft 24 is rotatably mounted, and on one end of this shaft is a sprocket-wheel 25, having a sprocket-chain 26 passed under it, around the said idler 23, and over a sprocket-wheel 27, fixed to the shaft 16. Hence this shaft 24 will be constantly rotated during the advance of the machine. A rectangular frame 28 is pivoted at its forward lower corner to the said shaft 24, and said frame extends straight rearwardly. A mating frame is pivoted at the opposite side of the machine, and in the rear lower corner of this frame a shaft 29 is fixed, which serves to clamp the rear ends of the said frames together and which provides a bearing for the sprocket-wheels 30, which are rotatably mounted thereon. An endless conveyer 31, composed of a series of transversely-extended rods having integral hooks extending at right angles from their ends and interlocked, is passed over the said sprockets 30 and also over the sprockets 32, fixed to the shaft 24. Thus an auxiliary conveyer is provided to extend from a point in the rear of the conveyer 14 and a considerable distance rearwardly to the point of discharge. Means are provided for raising and lowering this frame 28, so that when the front end of the harvester is elevated the said conveyer 31 will not rest upon the ground. These means comprise a lever 33, fulcrumed to a part of the machine-frame and extended straight upwardly at one side of the driver's seat. Attached to this lever is a gravity-actuated pawl 34, which is operated by the bell-crank lever 35, adjacent to the handle of the lever 33. A segmental rack 36 is fixed to the machine-frame adjacent to the pawl 34. A rod 37 is adjustably connected with the lever 33 and attached to the forward upper corner of the frame 28. Hence when the said lever is moved forwardly the rear lower corner of the frame 28 will necessarily be raised. I have provided means also for pulling upwardly upon the opposite side of the frame, as follows: 38 indicates a rock-shaft mounted in suitable bearings in the machine-frame and having the said lever 33 fixed to its one end. Its central portion is arched upwardly, so as not to interfere with the passage of potato-vines, &c., on the conveyer. On the opposite end of said rock-shaft 38 is an upwardly-projecting arm 39, pivoted to a rod 40, which rod connects with the forward upper corner of the frame 28 on the opposite side of the machine from the rod 37. I have provided two plates 41, fixed in the end of the harvester-frame to project rearwardly against the inner faces of the sides 28 to thereby cover the space between the said sides 28 and the rear of the machine when the frame of the auxiliary conveyer is lowered. In the frame 28 I have provided a number of slots 42, so arranged that the bolts which hold the parts of the frame together and which are passed through these slots may be loosened, and then the shaft which supports the sprocket-wheels at the rear of the frame may be adjusted forwardly or rearwardly, as required, to tighten or loosen the auxiliary conveyer. It is now obvious that the end of the frame 28 may be raised and lowered by the said lever 33 and, furthermore, that it may be fixed in any desirable position by means of the pawl 34 and rack 36.

Assuming that the device were in operation in a field and that the potatoes and earth, vines, &c., will be conveyed upwardly and rearwardly on the conveyer 14, it is obvious that earth, potatoes, and vines will be elevated and discharged from the rear end of the conveyer 14, drop upon my auxiliary conveyer 31, and the ground will pass through the said auxiliary conveyer 31, and the vines and clods will be held thereon, except those that are broken up by the fall from the forward conveyer. It is obvious that all of the earth that is broken up by the fall will pass through the conveyer 31, and thus fall to the ground before the potatoes, which will pass to the rear end of the conveyer. Hence by this arrangement the potatoes are always deposited on top of the earth and are not buried by the broken-up clods of earth that fall from the conveyer 14, as heretofore.

Having thus described my invention, what I claim as new therein, and desire to secure by Letters Patent of the United States therefor, is—

1. In combination with a potato-harvester having a conveyer to move upwardly and rearwardly and carry earth and potatoes and discharge them from the rear of the conveyer, an auxiliary vertically-adjustable conveyer having a hinged connection with the frame of the machine and composed of a series of transversely-extended bars adapted to permit the lumps of earth to be broken up as they fall thereon and to pass through said auxiliary conveyer and to carry the potatoes to a point of discharge in the rear so that they will fall on top of the earth, and means for raising and lowering the rear end of the auxiliary conveyer in the manner set forth for the purposes stated.

2. In combination with a potato-harvester, a frame pivoted at its forward lower corner to the rear end of the harvester-frame, and capable of swinging in a vertical plane, a conveyer mounted in said frame to extend rearwardly, and composed of transversely-extending rods having hooks projecting at right angles from their ends and interlocked, means for operating said conveyer from the traction-wheels of the harvester, an arched shaft having its bearings in the harvester-frame adjacent to the operator's seat, a lever fixed to one end thereof, and an arm formed on the opposite end thereof, rods connecting said lever and arm with the forward top ends of the auxiliary-conveyer frame, and a ratchet device for securing said lever in position all arranged and combined substantially in the manner set forth, and for the purposes stated.

GEORGE M. ROSS.

Witnesses:
N. C. SPRAGUE,
THOMAS G. ORWIG.